M. S. Palmer,
Fishing-Line Reel,
Nº 27,305. Patented Feb. 28, 1860.
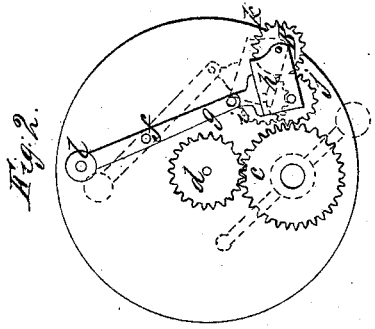
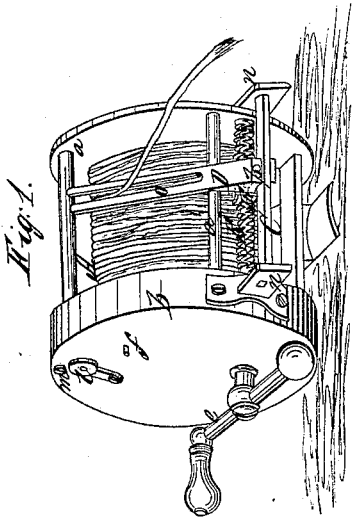
Witnesses:
Inventor:

UNITED STATES PATENT OFFICE.

MARK S. PALMER, OF NEW BEDFORD, MASSACHUSETTS.

IMPROVEMENT IN FISHING-REELS.

Specification forming part of Letters Patent No. 27,305, dated February 28, 1860.

*To all whom it may concern:*

Be it known that I, MARK S. PALMER, of New Bedford, in the county of Bristol and State of Massachusetts, have invented a new and useful Improvement in Reels for Fishing-Rods; and I do hereby declare that the following is a full, clear, and exact description of the same, reference being had to the annexed drawings, making a part of this specification, in which—

Figure 1 is a perspective view of a reel with my invention applied to it; Fig. 2, an end view of the same, with the box detached to show the gearing.

Similar letters of reference indicate corresponding parts in the two figures.

This invention consists in the employment or use of a traveling or reciprocating line-guide attached to the reel and operating automatically and in such a way as to cause the line, as it is wound up, to be adjusted evenly on the shaft of the reel.

To enable those skilled in the art to fully understand and construct my invention, I will proceed to describe it.

A represents a reel of ordinary construction, a being the frame, and b the box at one end, which contains the multiplying-gear c d, through which the reel-shaft is rotated from the crank e. In this box b there is fitted on a fulcrum-pin, f, a lever, g, to one end of which a socket, h, is attached by a pivot, i. This socket h has a pinion, j, fitted within it near one end, and the opposite end is fitted on the end of a shaft, B, which passes into the box b and socket h and has a pinion, k, on it, which pinion gears into the pinion j. The socket h, by raising or lowering the uppermost end of lever g, will have its inner end raised or lowered and the pinion j thrown in or out of gear with the wheel c, as may be desired. (See red lines, Fig. 2.)

The pinion j may be secured either in or out of gear with wheel c by means of screw and nut l m, the screw passing through a curved slot in the outer plate of box b into the upper end of bar g, and the nut m fitted on said screw at the outer side of the box. (See Fig. 1.)

The shaft B extends entirely across the front side of the reel, and it has a right-and-left screw-thread cut on it, one thread being cut over the other, as shown clearly in Fig. 1. To each end of the reel-frame a there is attached a horizontal projection, n, and these projections form bearings for a rectangular bar, C, as shown clearly in Fig. 1.

D is a bar, the lower part of which has a transverse slot made in its outer side to receive the bar C. The bar D is slotted vertically, as shown at o, and to its inner side a half-nut, E, is attached by a pivot, p, said half-nut engaging with the front side of the screw-shaft B, and being kept properly adjusted thereto by the bar C. The bar D serves as a line-guide, the line passing through the slot o, as shown in Fig. 1.

The operation is as follows: In order to wind up the line evenly on the reel A, the upper end of the lever g is shoved upward and retained in such position by the nut m being screwed up against the outer side of box b. In this position of lever g the pinion j is in gear with wheel c, and as the crank e is rotated a rotary motion is communicated to the shaft B, and said shaft, through the medium of the half-nut E, communicates a reciprocating movement to the line-guide D, the latter moving the whole length of bar C, on which it is allowed to slide freely. The screws at each end of the shaft B unite with each other, and the half-nut E, in consequence of being attached by the pivot p to the line-guide, is allowed to incline itself in either position to conform to the pitch of the screw-threads of screw B, and thereby permit the change of movement of the guide at each end of the shaft B. This reciprocating movement of the guide D causes the line to be wound evenly on the reel-shaft.

When the line-guide is not required—as, for instance, in casting out a line—the upper end of lever g is shoved down, the inner end of socket h thereby elevated, and the pinion j consequently thrown out of gear with wheel c, as shown in red, Fig. 1.

Having thus described my invention, what I claim as new, and desire to secure by Letters Patent, is—

1. The reciprocating line-guide D, applied to the reel and operated from the gearing connected with the crank e by the right-and-left screw-shaft B and pivoted nut E, substantially as set forth.

2. The arrangement of the pinions j k, socket h, and bar g, substantially as shown, to admit of the ready throwing in and out of gear of the shaft B with the wheel c, as set forth.

MARK S. PALMER.

Witnesses:
 M. G. HOWE,
 PELEG HOWLAND.